United States Patent
Tanaka (10) Patent No.: US 6,587,141 B1
(45) Date of Patent: Jul. 1, 2003

(54) IMAGE-TAKING LENS SYSTEM

(75) Inventor: Isao Tanaka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/050,582

(22) Filed: Mar. 30, 1998

(30) Foreign Application Priority Data

Apr. 4, 1997 (JP) ............................................. 9-086646

(51) Int. Cl.$^7$ ......................... H04N 5/232; H04N 5/262
(52) U.S. Cl. .............................. 348/211.99; 348/211.9; 348/240.99
(58) Field of Search ................................. 348/211, 212, 348/213, 222, 207, 375, 373, 552, 345, 357, 358, 335, 143, 211.99, 211.9, 222.1, 207.99, 240.99, 211.14; 396/71, 83, 89, 91, 93, 135, 529, 530, 535, 544

(56) References Cited

U.S. PATENT DOCUMENTS

| | | | | |
|---|---|---|---|---|
| 4,974,088 A | * | 11/1990 | Sasaki ......................... | 348/213 |
| 5,053,798 A | * | 10/1991 | Ohara et al. ................. | 396/135 |
| 5,068,735 A | * | 11/1991 | Tuchiya et al. ............. | 348/213 |
| 5,325,145 A | * | 6/1994 | Hirasawa ..................... | 396/81 |
| 5,839,002 A | * | 11/1998 | Miyake et al. ................ | 396/91 |
| 5,877,811 A | * | 3/1999 | Iijima et al. ................. | 348/220 |

FOREIGN PATENT DOCUMENTS

EP         0497376        8/1992

OTHER PUBLICATIONS

Patent Abstracts of Japan No. JP 63 174477 A published Jul. 18, 1988, vol. 12, No. 447.

Patent Abstracts of Japan No. JP 03 268583 A, published Nov. 29, 1991, vol. 16, No. 084.

Patent Abstracts of Japan No. JP 03 280789 A, published Dec. 11, 1991, vol. 16, No. 104.

Patent Abstracts of Japan No. JP 04 213280 A, published Aug. 4, 1992, vol. 16, No. 558.

Patent Abstracts of Japan No. JP 07 079375 A, published Mar. 20, 1995, vol. 95, No. 006.

Patent Abstracts of Japan No. JP 08 088790 A, published Apr. 2, 1996, vol. 96, No. 008.

* cited by examiner

*Primary Examiner*—Aung S. Moe
(74) *Attorney, Agent, or Firm*—Robin, Blecker & Daley (57) ABSTRACT

An image-taking lens system includes an image-taking lens, a lens driving control part for driving and controlling the image-taking lens, a reading part for reading information from a storage medium in which a plurality of pieces of lens control information according to conditions of shooting are stored, and a setting part for setting control parameters of the lens driving control part on the basis of the information read by the reading part. The arrangement enables the operator of the system to quickly change control characteristics for zooming and focusing as desired according to shooting conditions.

6 Claims, 6 Drawing Sheets

|  | ZOOM CONTROL ITEM 1 | ZOOM CONTROL ITEM 2 | FOCUS CONTROL ITEM 1 | FOCUS CONTROL ITEM 2 | ZOOM COMMAND CONTROL ITEM 1 | ZOOM COMMAND CONTROL ITEM 2 | FOCUS COMMAND CONTROL ITEM 1 | FOCUS COMMAND CONTROL ITEM 2 | ANOTHER ITEM 1 | ANOTHER ITEM 2 | ANOTHER ITEM 3 | | | |
|---|---|---|---|---|---|---|---|---|---|---|---|---|---|---|
| DATA SET 1 | | | | | | | | | | | | | | |
| DATA SET 2 | | | | | | | | | | | | | | |
| DATA SET 3 | | | | | | | | | | | | | | |
| DATA SET 4 | | | | | | | | | | | | | | |
| DATA SET 5 | | | | | | | | | | | | | | |
| DATA SET 6 | | | | | | | | | | | | | | |
| DATA SET 7 | | | | | | | | | | | | | | |
| DATA SET 8 | | | | | | | | | | | | | | |

IMAGE-TAKING LENS SYSTEM

BACKGROUND OF THE INVENTION

1. Field of the Invention

The present invention relates to an image-taking lens system arranged to be capable of controlling and driving movable optical members provided for zooming, focusing, etc., and more particularly to a broadcasting television lens system.

2. Description of Related Art

Figure 5:
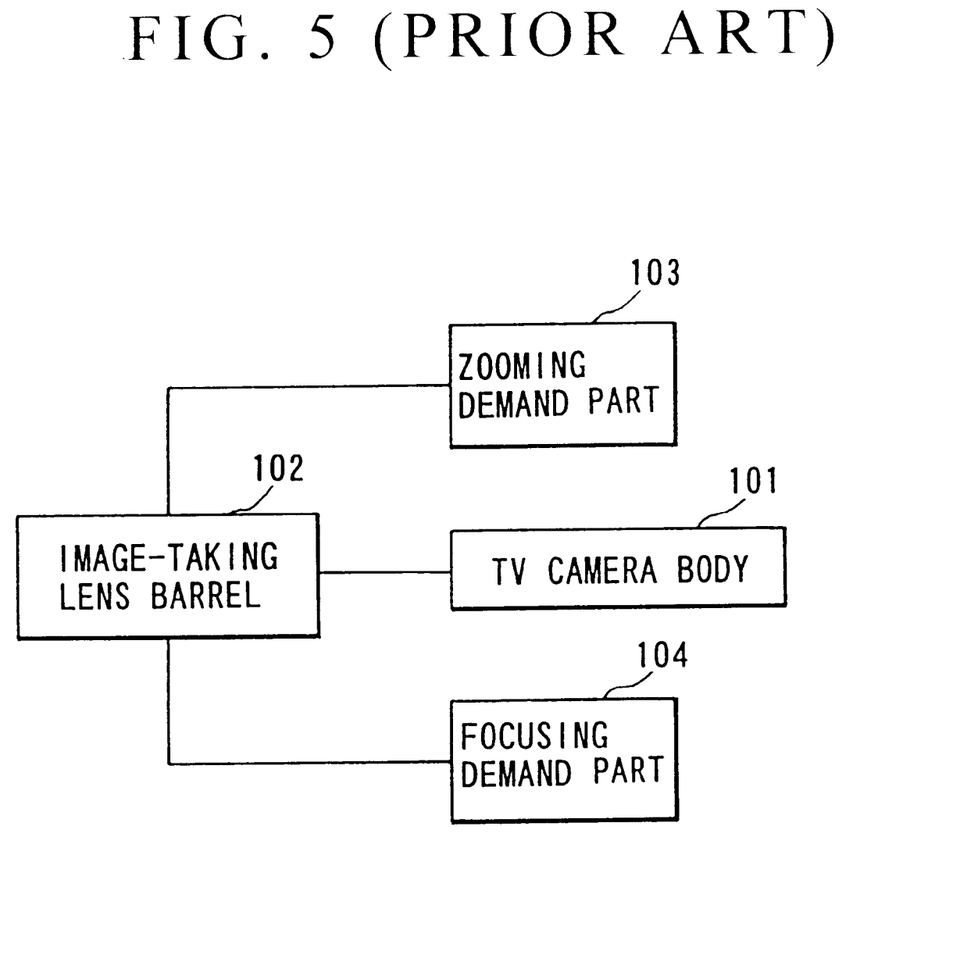
FIG. 5 is a block diagram showing in outline the arrangement of the conventional TV lens system.

FIG. 5 is a block diagram showing the arrangement of the conventional TV (television) lens system. As shown in FIG. 5, in the TV lens system, an image-taking lens barrel 102 is connected to a TV camera body 101 which is an image pickup apparatus. To the image-taking lens barrel 102 are also connected a zooming demand part 103 and a focusing demand part 104 which are included in an image-taking lens remote-control device. The operator of the TV lens system, such as a cameraman, can perform zooming and focusing of the TV lens system by operating the zooming demand part 103 and the focusing demand part 104 so as to obtain pictures according to situations.

Figure 6:
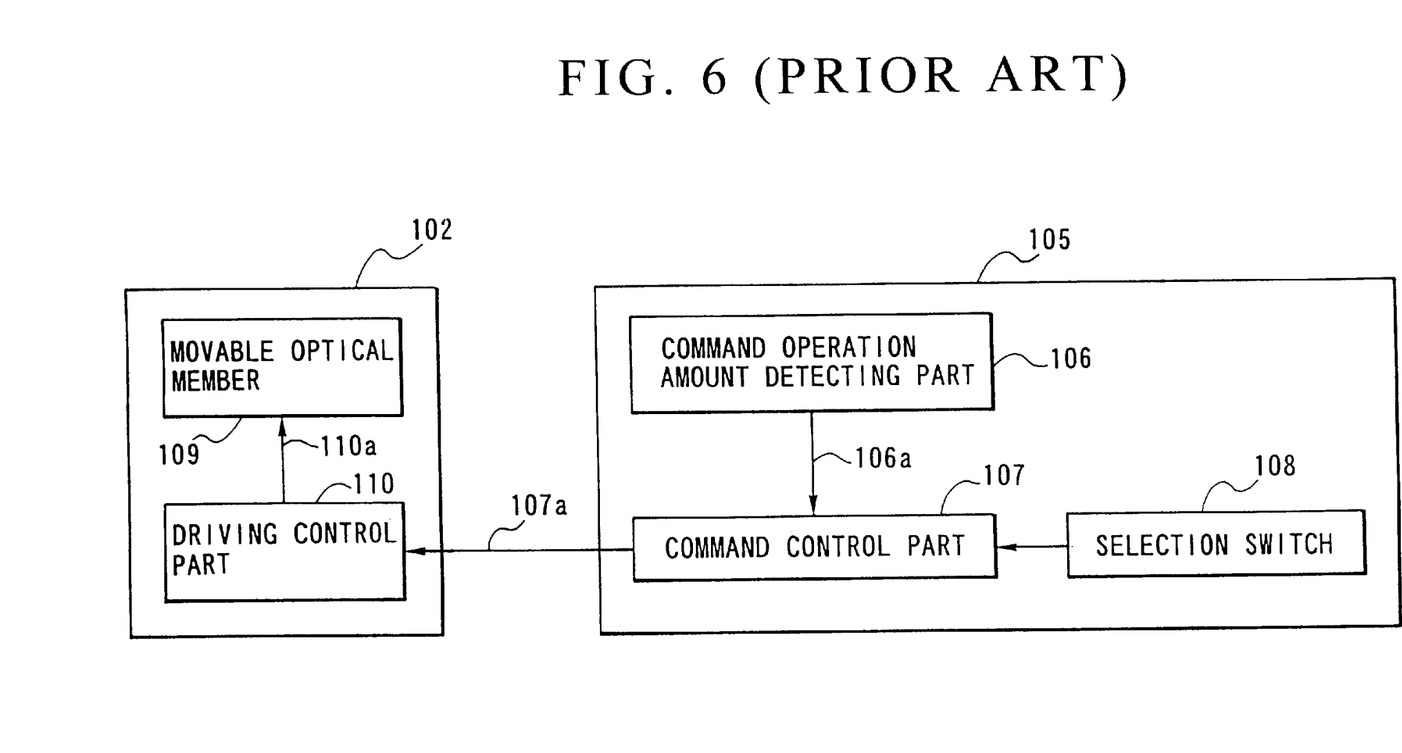
FIG. 6 is a control block diagram showing the arrangement for control over movable optical members in the conventional TV lens system.

FIG. 6 is a block diagram showing an arrangement for control over movable optical members such as zooming and focusing lenses in the conventional TV lens system. Referring to FIG. 6, when the operator operates a command member of the zooming or focusing demand part 103 or 104 shown in FIG. 5, a command operation amount detecting part 106 generates a command voltage 106a according to the amount of operation. The command voltage 106a is supplied to a command control part 107 which is composed of an analog circuit, etc. The command control part 107 converts the command voltage 106a into a command voltage signal 107a which conforms to the TV lens system. The command voltage signal 107a is inputted to the image-taking lens barrel 102.

At the image-taking lens barrel 102, the command voltage signal 107a inputted is supplied as a command value to a zooming and focusing driving control part 110 which is composed of an analog servo circuit, etc., for zooming, focusing, etc. An output signal 110a of the driving control part 110 is supplied to a motor arranged to actuate zooming, focusing or the like. A movable optical member 109 which is interlocked with the motor is then moved by the motor.

With regard to driving operations for zooming and focusing in the TV lens system, it has been required that the servo characteristic and operability of the TV lens system are arranged to be readily variable according to differences of shooting objects, such as drama shooting and sport relay broadcasting, etc., and also according to differences in operating method among camera operators. For example, a drama shooting operation to be performed within a studio requires a servo characteristic which permits a slow and smooth zooming operation, rather than a speedy zooming operation, and an operability which permits easy focusing at a focal length suited for shooting objects disposed within the studio. For For an outdoor shooting such as a baseball relay broadcasting, on the other hand, a servo characteristic which permits zooming and focusing at a maximum speed for following a fast moving object and a ball and an operability which makes focusing on the infinity distance side of the lens easier than focusing on the nearest distance side of the lens.

While a TV lens system is thus required to have its servo characteristic and operability arranged to be readily variable according to the difference of shooting objects and the difference in liking among operators, the conventional TV lens system has been incapable of meeting this requirement. Some of known focusing and zooming demand parts have been arranged to vary the operability of the demand part by using a selection switch 108 as shown in FIG. 6 or a volume adjuster to shift the constant of an analog circuit within the demand part either continuously or noncontinuously in such a way as to vary a relation between the amount of operation and a command voltage.

However, the method for varying the operability by shifting the constant of the analog circuit disposed within the demand part by means of a switch or a volume adjuster to vary the command value in relation to the amount of operation has had the following shortcomings. According to that method, the servo characteristic of the TV lens system remains unchanged. Therefore, it has been impossible to improve the overall operability including the servo characteristic. Besides, switch-over of the relation between the demand operation amount and the amount of command by using the switch mounted on the zooming demand part or the focusing demand part is possible only for two or three fixed patterns of constants set beforehand by hardware means. It is, therefore, hardly possible to cope with all shooting situations as desired by the operator.

Another method of continuously varying the circuit constant by using a volume adjuster has been very troublesome, because it necessitates frequent volume adjustment, confirmation of the result of adjustment and repeating the adjusting operation for every shooting operation. Besides, the demand parts permit selection of only predetermined relations between command amounts and command voltages. Therefore, it has been difficult for the operator to readily change the existing setting and to store new setting as desired. Further, according to the prior art arrangement, items for which setting values are variable has been limited to the operation amount and the command amount of the operation member of the zooming or focusing demand part.

Further, as related art, there is Japanese Laid-Open Patent Application No. Hei 5-22729.

BRIEF SUMMARY OF THE INVENTION

In view of the above-stated problems of the prior art, it is an object of the invention to provide means for varying a servo characteristic, operability, etc., for zooming and focusing without difficulty according to the shooting object and as desired by the operator.

To attain the above object, in accordance with an aspect of the invention, there is provided an image-taking lens system, which comprises an image-taking lens, lens driving control means for driving and controlling the image-taking lens, reading means for reading information from a storage medium in which a plurality of pieces of lens control information corresponding to conditions of shooting are stored, and setting means for setting control parameters of the lens driving control means on the basis of the information read by the reading means. The arrangement enhances, for example, servo characteristics and operability for zooming and focusing differently required by individual shooting objects and individual operators.

In the image-taking lens system, the image-taking lens is detachably mountable on a camera body, and the reading means is disposed at the image-taking lens.

The image-taking lens system further comprises remote operation control device for remotely operating and commanding the lens driving control means. The remote operation control means includes receiving means for receiving information read by the reading means and permits the operator of the system to vary the operating characteristic of a lens driving operation member according to the information received, i.e., as desired by the operator.

The image-taking lens system further comprises selection means for selecting necessary information from among a plurality of pieces of information read by the reading means. The setting means is arranged to set control parameters of the lens driving control means according to the information selected.

The above and further objects and aspects of the invention will become apparent from the following detailed description of a preferred embodiment thereof taken in connection with the accompanying drawings.

DETAILED DESCRIPTION OF THE INVENTION

Hereinafter, a preferred embodiment of the invention will be described in detail with reference to the drawings.

Figure 1:
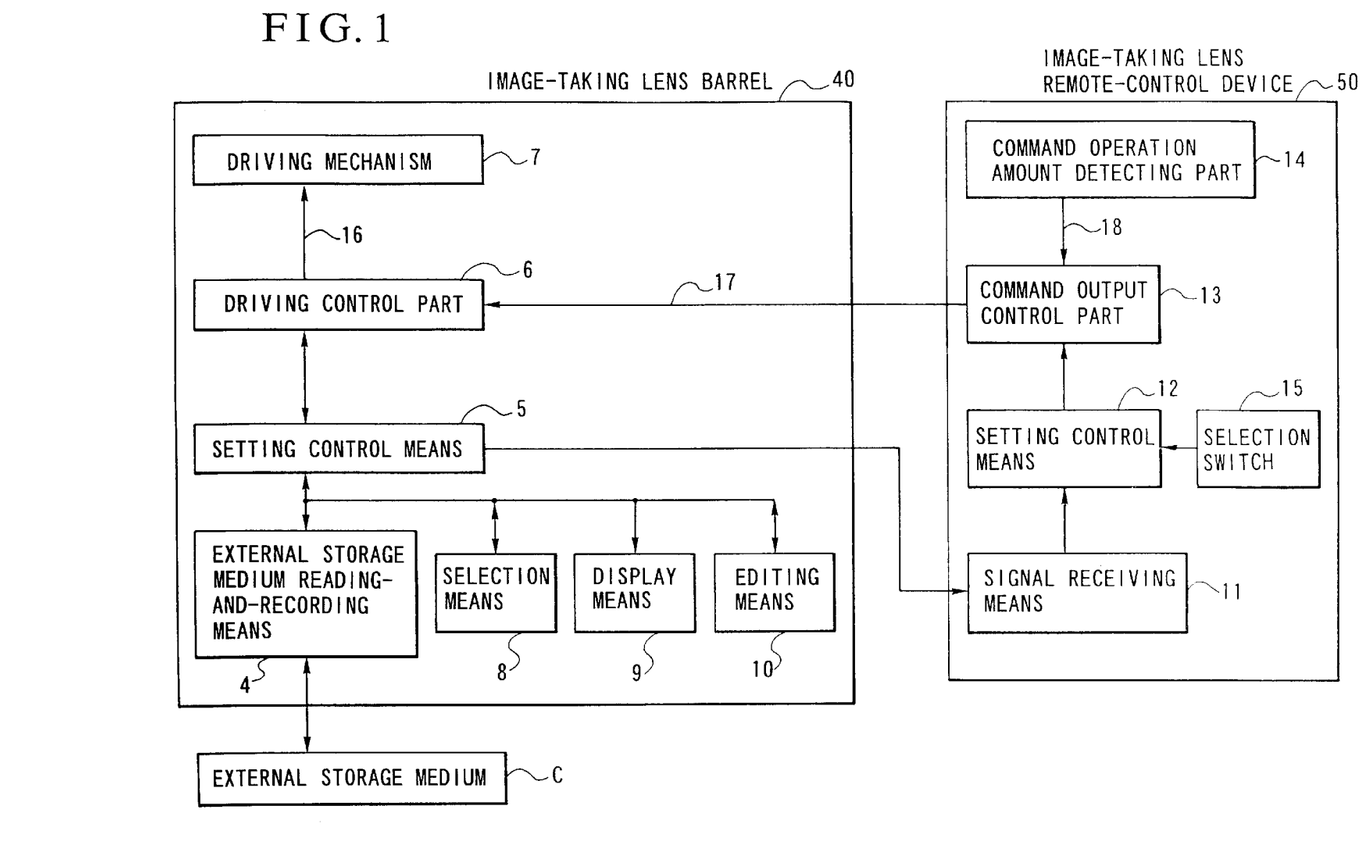
FIG. 1 is a control block diagram showing the arrangement of a TV lens system according to an embodiment of the invention.
Figure 2:
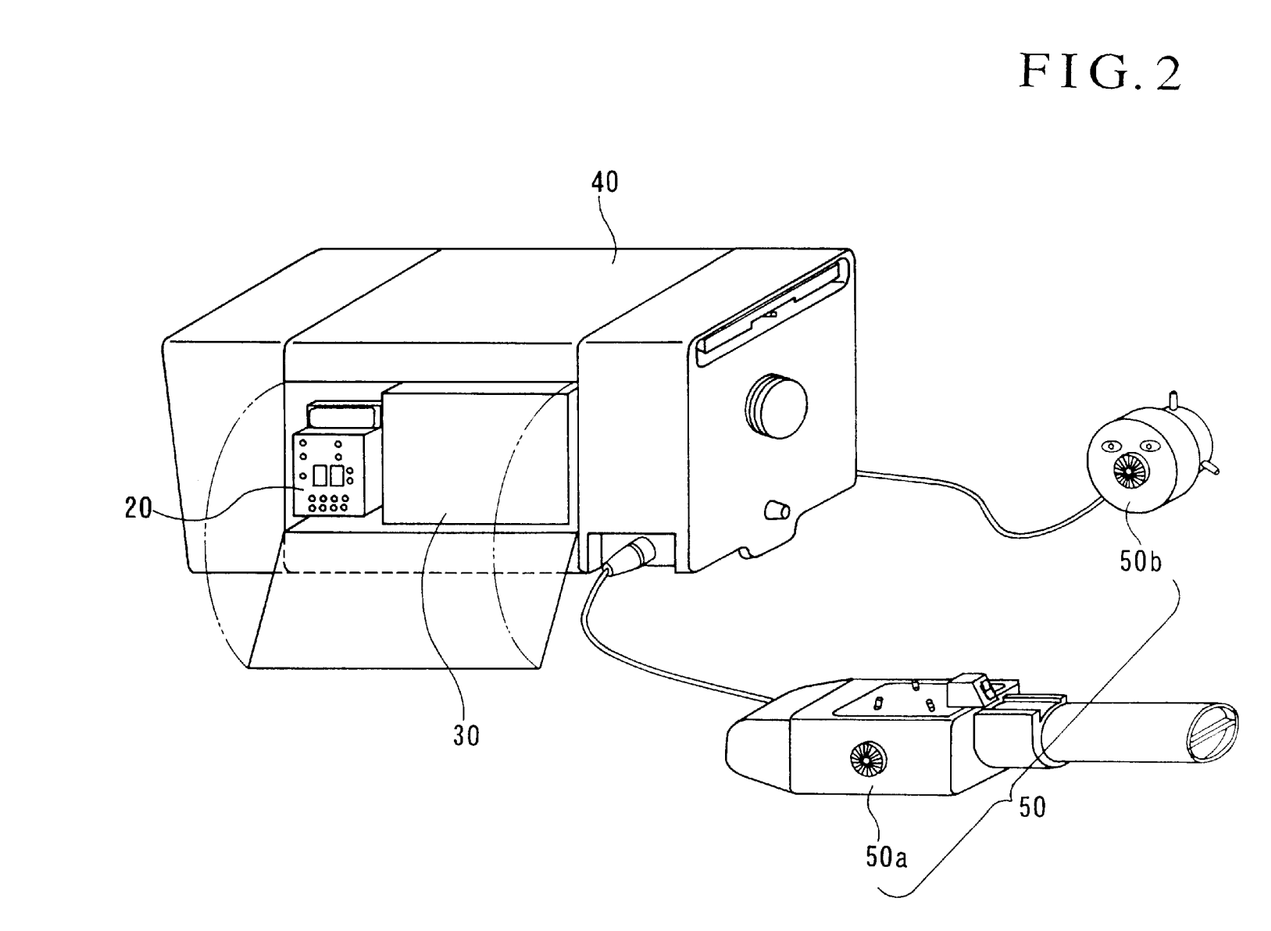
FIG. 2 is a perspective view showing the whole TV lens system according to the embodiment.

FIG. 1 is a block diagram showing the arrangement for control over movable optical members such as zooming and focusing lenses of a TV lens system according to the embodiment of the invention. FIG. 2 is a perspective view showing the appearance of the TV lens system.

Referring to FIG. 1, an external storage medium C is a card memory or the like arranged to store contents which will be described later herein. An image-taking lens barrel 40 includes a zooming part, a focusing part and a control circuit and is arranged to be mounted on a camera body which is not shown.

An image-taking lens remote-control device 50 comprises a zoom demand part 50a and a focusing demand part 50b as shown in FIG. 2.

Referring to FIG. 2, a memory card unit 20 is arranged to read information from the external storage medium C and make a display of the information read, and has a selection switch for performing control according to conditions of shooting. The memory card unit 20 will be described in detail later herein with reference to FIG. 3.

A TV lens control part 30 shown in FIG. 2 is arranged to perform driving control for zooming, focusing, etc., and to control other actions of the TV lens system.

Figure 4:
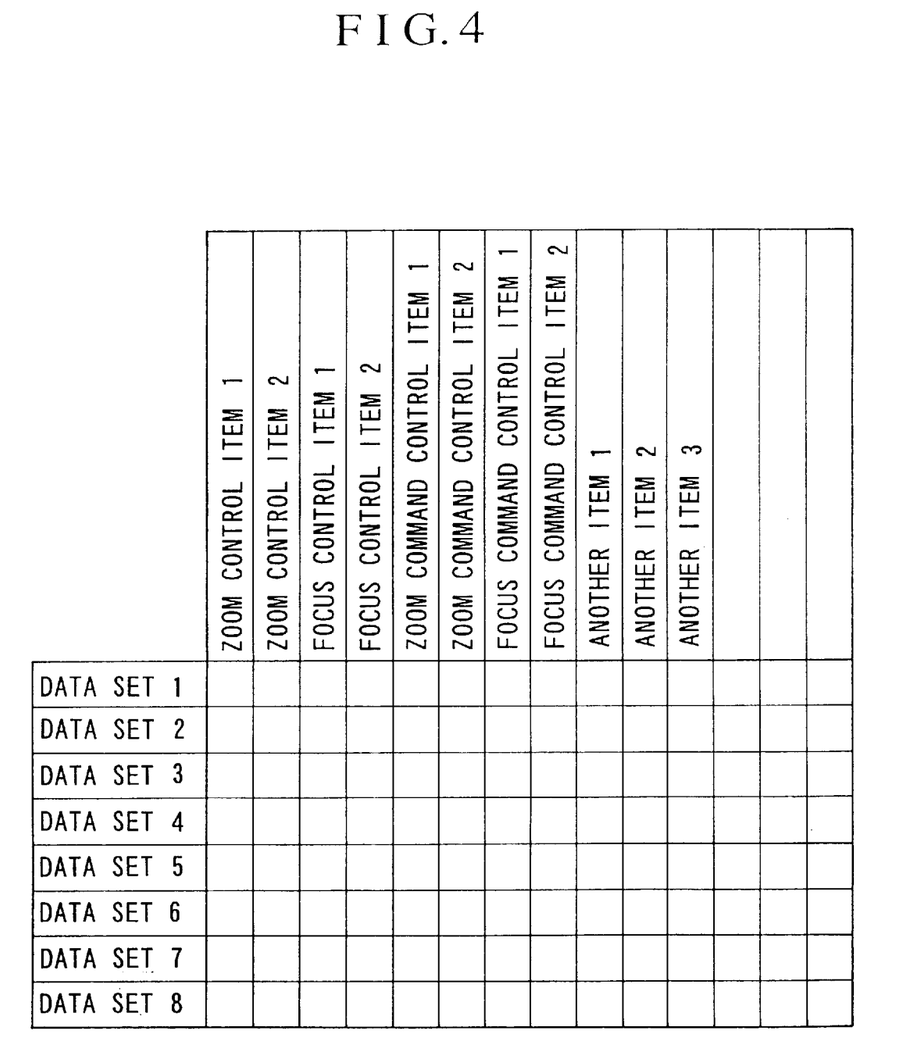
FIG. 4 is a table showing the contents stored in a storage medium in the embodiment.

The contents stored in the external storage medium C is next described briefly with reference to FIG. 4. FIG. 4 shows, by way of example, information set within one sheet of card type storage medium.

Referring to FIG. 4, one sheet of card type storage medium is capable of storing a total of eight data sets, which are indicated as data sets 1 to 8. The data sets 1 to 8 respectively correspond to a plurality of shooting conditions, such as outdoor shooting, drama shooting, a studio shooting, etc. The outdoor shooting includes a sport shooting, landscape shooting, etc. The cameraman or camera operator is expected to select an applicable and appropriate number of data set according to the conditions of shooting.

Further, as shown in FIG. 4, one data set has a plurality of setting items. For example, there are two setting items relative to a zoom driving control, two setting items relative to a focus driving control, one item relative to setting a driving method either singly for zooming or focusing or for zooming and focusing in combination, two items relative to setting zoom demanding command control, two items relative to setting focus demanding command control, and a plurality of items relative to other control setting. For each of setting items, one of a plurality of setting values is set. Such information (setting parameters) is stored in the storage medium. The operator is allowed to select or set the pieces of information as desired.

More specifically, with respect to the setting items relative to zoom driving control among other items, a zooming speed (a maximum zooming speed, for example), a rise or fall characteristic responsive to a zoom command relative to the lens moving speed, etc., are set in the first place. As for the setting items relative to focusing driving control, a focusing speed (a maximum focusing speed, for example) and a degree of precision of stopping position for the focusing lens are set. In respect to the setting items relative to the zoom demanding command control, a response characteristic to a zooming operation performed by the operator, such as setting operation sensitivity, etc., are set. These setting items are stored in the storage medium to allow the operator to select them as necessary.

In other words, the operator is allowed to make lens operation setting as desired according to his or her own liking. Zoom and focusing servo characteristics, zoom and focusing demand operation characteristics, etc., are variable as desired by selecting desired setting items and desired setting values according to the conditions of shooting. The embodiment thus enables the operator to selectively obtain characteristics in innumerable variety.

The control arrangement shown in FIG. 1 performs control on the basis of the information stored in the above-stated manner. Referring again to FIG. 1, an external storage medium reading-and-recording means 4 is arranged to read and record from and into the external storage medium C the above-stated setting information such as control parameters relative to control actions to be carried out by the image-taking lens barrel 40 and the image-taking lens remote-control device 50.

A setting control means 5 is arranged such that, in a case where the setting information read out by the external storage medium reading-and-recording means 4 relates, for example, to driving control over the movable optical members such as the zooming or the focusing lens, the setting control means 5 changes driving control parameters of varied kinds (computing coefficients) of a driving control part 6 according to the applicable setting item. If the setting information relates to the image-taking lens remote-control device 50, the setting control means 5 transmits the setting information to a signal receiving means 11 which is disposed within the image-taking lens remote-control device 50.

The driving control part 6 which is provided for zooming, focusing, etc., is arranged to output a driving signal 16 for driving a zooming or focusing motor on the basis of control parameters which are changed by the setting control means 5 for driving control over zooming or focusing and a command signal 17 which is received from a command output control part 13 disposed within the image-taking lens remote-control device 50.

A driving mechanism 7 includes motors for driving focusing and zooming lenses and potentiometers and rotary encoders for position detection. The driving mechanism 7 is arranged to optically change the positions of zooming and focusing on the basis of the signal received from the driving control part 6 for zooming and focusing.

A selection means 8 is arranged to select information from among setting information of varied kinds read out from the external storage medium C by the external storage medium reading-and-recording means 4. In a case where setting information retained within the image-taking lens barrel 40 or within the image-taking lens remote-control device 50 is to be recorded on the external storage medium C, the selection means 8 selects information to be recorded from among the setting information of different kinds.

A display means 9 is arranged to enable the operator to know the state of the setting information, etc. An editing means 10 is arranged to read a plurality of pieces of setting information from a single or a plurality of external storage media C through the external storage medium reading-and-recording means 4 and to permit preparation of a new combination of pieces of setting information.

The image-taking lens remote-control device 50 includes the signal receiving means 11 which is arranged to receive, from the setting control means 5 of the image-taking lens barrel 40, setting information to be changed on the side of the image-taking lens remote-control device 50. A setting control means 12 which is disposed on the side of the image-taking lens remote-control device 50 is arranged to set various matters within the image-taking lens remote-control device 50 on the basis of setting information of varied kinds obtained through the signal receiving means 11 and also information coming from a selection switch 15 which is provided on the side of the image-taking lens remote-control device 50.

In a case where the setting information includes, for example, information relative to command control, the setting control means 12 set parameters, etc., related to command control at the command output control part 13. A command operation amount detecting part 14 is arranged to output an operation command 18 in proportion to the amount of operation when the operator, or cameraman, performs a zooming or focusing operation. The command output control part 13 is arranged to form the command signal 17 to be applied to the image-taking lens barrel 40 according to the operation command 18 coming from the command operation amount detecting part 14 and on the basis of the parameters relative to command control set by the setting control means 12 within the image-taking lens remote-control device 50.

In the arrangement described above, it is now assumed that, with respect to driving control over zooming, focusing, etc., of the TV lens system, there are a first external storage medium and a second external storage medium; the first external storage medium (a master card) storing all setting values of zooming and focusing control of the TV lens system to cover zooming and focusing demands according to image-taking conditions, and the second external storage medium being individually possessed by the operator.

The operator first connects the first external storage medium to the external storage medium reading-and-recording means 4. After that, the operator selects a desired combination of setting values by the selection means 8 while looking at the display means 9. The setting values of varied kinds thus selected are read by the external storage reading-and-recording means 4. The setting control means 5 then changes various driving control parameters of the driving control part 6 for zooming, focusing, etc., according to the setting values read by the external storage reading-and-recording means 4.

If the setting values selected include setting values related to the image-taking lens remote-control device 50, the setting control means 5 of the image-taking lens barrel 40 sends the setting values of varied kinds to the setting control means 12 disposed within the image-taking lens remote-control device 50 through the signal receiving means 11 which is also disposed within the image-taking lens remote-control device 50.

Upon receipt of the various setting values from the setting control means 5 of the image-taking lens barrel 40 through the signal receiving means 11, the setting control means 12 of the image-taking lens remote-control device 50 decides parameters, etc., for command control according to the various setting values inputted and the state of the selection switch 15 mounted on the image-taking lens remote-control device 50 and sets the decided command control parameters at the command output control part 13. At the command output control part 13, the operation command 18 received from the command operation amount detecting part 14 is converted into the command signal 17 on the basis of the setting values set by the setting control means 12. The command signal 17 is sent out to the image-taking lens barrel 40.

The use of the first external storage medium thus enables the operator to easily change the various control parameters of the image-taking lens barrel 40 and those of the image-taking lens remote-control device 50. In respect of driving control for zooming and focusing, for example, the conventional arrangement allows the operator to change the operation characteristics of zooming and focusing demands only to a slight extent by means of a switch or a volume adjusting part. The arrangement of the embodiment of the invention described, on the other hand, enables the operator to change a zooming servo characteristic, a focusing servo characteristic, a zooming demand operation characteristic, a focusing demand operation characteristic, etc., into any of almost innumerable characteristics as desired, by using setting values of a plurality of setting items according to the shooting conditions, etc.

After completion of the above-stated operation of selective setting information reading from the first external storage medium, the second external storage medium which is individually or personally possessed by the operator may be connected to the external storage medium reading-and-recording means 4. With the second external storage medium thus connected, the setting information obtained from the first external storage medium can be recorded on the second external storage medium by carrying out a recording operation on the second external storage medium. In this instance, the information to be recorded on the second external storage medium can be selected as desired by the selection means 8.

Further, a plurality of external storage media which have been set similarly to the first external storage medium may be serially connected to the external storage reading-and-recording means 4 one after another by the editing means 10. After that, by connecting the second external storage medium to the external storage reading-and-recording means 4 and by carrying out a recording operation, it is possible to selectively collect only necessary setting values either from one or a plurality of external storage media and to record the selected setting values in one of the external storage media by operating the editing means 10. In that instance, the operator can easily arrange the TV lens system according to the operator's own liking.

Figure 3:
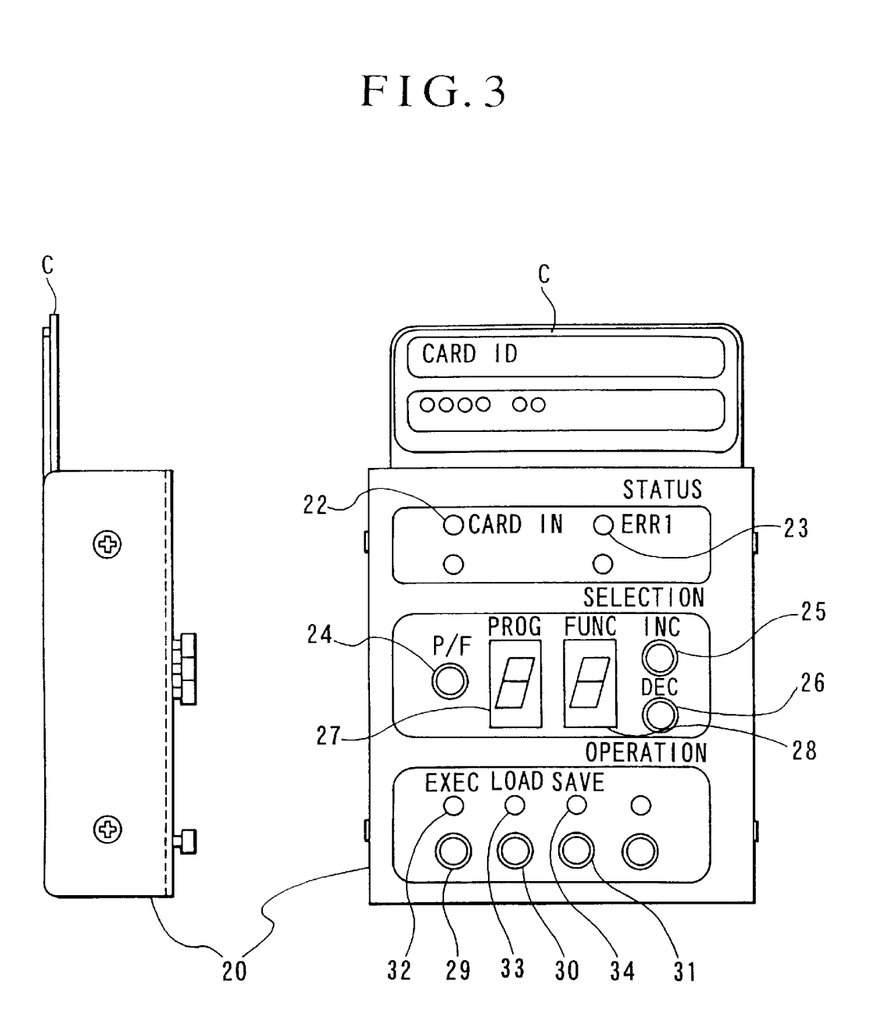
FIG. 3 shows the appearance of a memory card unit in the embodiment.

FIG. 3 shows in detail the arrangement of the memory card unit 20. Referring to FIG. 3, a card type storage medium C is arranged to permit reading therefrom and writing therein the above-stated setting information of varied kinds and to be detachably mountable on the memory card unit 20. A storage medium mounting indicator 22 is arranged to show whether or not the card type storage medium C is correctly mounted on the memory card unit 20. An error indicator 23 is arranged to show that the card type storage medium C is not normally handled. A data-set/item selecting switch 24 is provided for selection of a mode of selecting data sets previously selected or a mode of switching items within the data sets.

Selection switches 25 and 26 are arranged to permit selection of a data set or an item in the data set mode or in the item mode selected by the data-set/item selecting switch 24. A data set number indicator 27 is arranged to show the number assigned to a data set currently selected. An item indicator 28 is arranged to show a setting item currently selected.

An execution switch 29 is provided for reading out from the card type storage medium C one or a plurality of items within one data set selected by the data-set/item selection switch 24 and the selection switch 25 or 26 and for carrying out a changing action on one or a plurality of setting values of the image-taking lens barrel 40 and the image-taking lens remote-control device 50 on the basis of the setting value or values read out. A reading switch 30 is provided for reading out from the card type storage medium C one or a plurality of items within one data set selected by the data-set/item selection switch 24 and the selection switch 25 or 26 and for causing the information read out to be stored within the image-taking lens barrel 40 or the image-taking lens remote-control device 50.

A writing switch 31 is provided for carrying out a rewriting action to replace one of or a plurality of items selected from among the setting values of varied kinds stored within the image-taking lens barrel 40 or the image-taking lens remote-control device 50 by the data-set/item selection switch 24 and the selection switch 25 or 26 with one or a plurality of items selected from one data set stored in the card type storage medium C also by the data-set/item selection switch 24 and the selection switch 25 or 26.

An execution indicator 32 is arranged to show that the image-taking lens barrel 40 and the image-taking lens remote-control device 50 are in action on the basis of the setting values which are read out from the card type storage medium C by the execution switch 29. A reading indicator 33 is arranged to show that setting information which is read out from the card type storage medium C by the reading switch 30 is stored in the image-taking lens barrel 40 and the image-taking lens remote-control device 50. A writing indicator 34 is arranged to show that a setting item designated is written from the image-taking lens barrel 40 into the card type storage medium C by the writing switch 31.

With the memory card unit 20 shown in FIG. 3 arranged as described above, the card type storage medium C which has already been set is first mounted on the memory card unit 20. When the card type storage medium C is found to be correctly mounted, the storage medium mounting indicator 22 either lights up or flickers to let the operator know that the card type storage medium C is correctly mounted. If the card type storage medium C is found to be not correctly mounted, the error indicator 23 either lights up or flickers.

When the storage medium mounting indicator 22 lights up or flickers to show that the card type storage medium C is correctly mounted, the operator operates the data-set/item selection switch 24 and the selection switches 25 and 26 to select a data set and one or a plurality of items desired to be set in the image-taking lens barrel 40 and the image-taking lens remove control device 50 while watching the data set number indicator 27 and the item indicator 28 for confirmation.

Next, to decide what is to be done for the data set and the item selected, the operator pushes the execution switch 29, the reading switch 30 or the writing switch 31. When the execution switch 29 is pushed, the selected item of a data set previously selected is read out from the card type storage medium C and is executed. The execution indicator 32 then lights up or flickers.

When the reading switch 30 is pushed, the selected item of a data set previously selected is read out from the card type storage medium C and written into the image-taking lens barrel 40 or the image-taking lens remote-control device 50. The reading indicator 33 then lights up or flickers. If it is the writing switch 30 that is pushed, the selected item of the previously selected data set is written from the image-taking lens barrel 40 or the image-taking lens remote-control device 50 into the card type storage medium C.

Further, it is possible to operate the reading switch 30 to read the setting value of each setting item from the card type storage medium C in which one or a plurality of setting values of varied kinds are stored, to prepare a new combination of setting values, and to form the new combination of setting values as one data set within a card type storage medium by operating the writing switch 31.

In the embodiment described above, an external storage reading device (the external storage medium reading-and-recording means 4) is disposed in the image-taking lens barrel 40. However, the external storage reading device may be disposed in the image-taking lens remote-control device, instead of the image-taking lens barrel. In the case of that modification, the signal receiving means 11 is disposed on the side of the image-taking lens barrel.

As described above, the image-taking lens system arranged according to the invention comprises the external storage medium recording-and-writing means, the setting control means, the signal receiving means, the display means, the editing means and the selection means. The arrangement facilitates various setting operations on the image-taking lens system by using an external storage medium which has already been set and allows the operator to arrange the image-taking lens system according to shooting conditions. Further, selectively set contents (setting values) of the system can be stored in a portable storage medium, so that the same image-taking lens system can be reproduced any time later on. In other words, the operator (cameraman) can readily form an image-taking lens system as desired according to any shooting conditions.

What is claimed is:

1. An image-taking lens barrel (40) mountable to a camera body, the lens barrel comprising:

a driving means (7) for driving optical elements of the lens barrel;

control means (6) for providing a lens control signal to the driving means (7);

user-operated command means (50) for inputting user commands to the control means (6);

a data reading means (4) disposed in said lens barrel for reading data from a storage medium (C); and the storage medium (C) stores a plurality of pieces of lens control information corresponding to the conditions of image-taking; and setting means (5) for setting a relationship between a user command input to the command means (50) and a corresponding lens control signal output to the driving means (7);

wherein the setting means (5) is operable to set the relationship between said user command and said corresponding lens control signal, on the basis of data read from said storage medium (C).

2. An image taking lens barrel according to claim 1, wherein said user-operated command means is a focus demand or a zoom demand.

3. An image-taking lens barrel according to claim 2, wherein the information read from the storage medium (C) is related to a zoom servo characteristic or a focus servo characteristic.

4. An image taking lens barrel according to claim 2, wherein the information read from the storage medium (C) is related to a zoom demand operation characteristics and a focusing demand operation characteristics.

5. An image-taking lens barrel according to claim 1, wherein the information read from the storage medium (C) is related to a zoom servo characteristic or a focus servo characteristic.

6. An image taking apparatus, wherein the image taking apparatus comprises said image taking lens barrel according to claim 1, and a camera body mountable to said image taking lens barrel.

* * * * *